US008942913B2

(12) United States Patent
Hota et al.

(10) Patent No.: US 8,942,913 B2
(45) Date of Patent: Jan. 27, 2015

(54) SYSTEM AND METHOD FOR ON-ROAD TRAFFIC DENSITY ANALYTICS USING VIDEO STREAM MINING AND STATISTICAL TECHNIQUES

(75) Inventors: Rudra Narayan Hota, D-Jajpur (IN); Kishore Jonna, Kadapa (IN); Radha Krishna Pisipati, Hyderabad (IN)

(73) Assignee: Infosys Limited, Bangalore (IN)

( * ) Notice: Subject to any disclaimer, the term of this patent is extended or adjusted under 35 U.S.C. 154(b) by 191 days.

(21) Appl. No.: 13/614,267

(22) Filed: Sep. 13, 2012

(65) Prior Publication Data

US 2013/0073192 A1 Mar. 21, 2013

(30) Foreign Application Priority Data

Sep. 20, 2011 (IN) ........................... 3243/CHE/2011

(51) Int. Cl.

*G06F 19/00* (2011.01)
*G06G 7/70* (2006.01)
*G06G 7/76* (2006.01)
*G08G 1/00* (2006.01)
*G08G 1/04* (2006.01)

(52) U.S. Cl.

CPC ........................................ *G08G 1/04* (2013.01)
USPC ........................................... 701/118; 701/117

(58) Field of Classification Search

USPC ............ 701/118, 117, 16, 532, 199; 340/907, 340/933, 905, 901, 934, 936; 348/155, 348/21.2, 170, 207, 148, 211.2; 455/414.3, 455/414, 456.2; 346/107; 240/961

See application file for complete search history.

(56) References Cited

U.S. PATENT DOCUMENTS

| | | | | | |
|---|---|---|---|---|---|
| 3,689,878 | A | * | 9/1972 | Thieroff | 340/907 |
| 5,465,115 | A | * | 11/1995 | Conrad et al. | 348/155 |
| 5,999,877 | A | * | 12/1999 | Takahashi et al. | 701/117 |
| 6,466,862 | B1 | * | 10/2002 | DeKock et al. | 701/117 |
| 6,970,102 | B2 | * | 11/2005 | Ciolli | 340/933 |
| 7,912,629 | B2 | * | 3/2011 | Sutter et al. | 701/118 |
| 8,457,401 | B2 | * | 6/2013 | Lipton et al. | 382/173 |
| 2002/0193938 | A1 | * | 12/2002 | DeKock et al. | 701/117 |
| 2004/0267440 | A1 | * | 12/2004 | DeKock et al. | 701/117 |
| 2005/0187677 | A1 | * | 8/2005 | Walker | 701/16 |
| 2005/0219375 | A1 | * | 10/2005 | Hasegawa et al. | 348/211.2 |
| 2005/0248469 | A1 | * | 11/2005 | DeKock et al. | 340/905 |
| 2006/0058941 | A1 | * | 3/2006 | DeKock et al. | 701/117 |
| 2008/0010002 | A1 | * | 1/2008 | DeKock et al. | 701/117 |

(Continued)

OTHER PUBLICATIONS

Janney P., et al., "Framework for Illumination Invariant Vehicular Traffic Density Estimation", Dept. of Computer Science and Engineering, National ICT, Australia (NICTA), Oct. 2008, pp. 1-11.

(Continued)

*Primary Examiner* — Thomas G Black
*Assistant Examiner* — Robert Payne
(74) *Attorney, Agent, or Firm* — LeClairRyan, a Professional Corporation

(57) ABSTRACT

A method and system for analyzing on-road traffic density are provided. The method involves allowing a user to select a video image capturing device and coordinates in a video image frame captured by the video image capturing device such that the coordinates form a region of interest (ROI). The ROI is processed to generate a confidence value and a traffic density value. The traffic density value is compared with a first set of threshold values. Based on the comparison, the traffic density values at different instants in a time window are displayed to enable monitoring of the traffic trend.

50 Claims, 8 Drawing Sheets

(56) References Cited

U.S. PATENT DOCUMENTS

| | | | | |
|---|---|---|---|---|
| 2008/0045197 | A1 * | 2/2008 | DeKock et al. | 455/414.3 |
| 2008/0045242 | A1 * | 2/2008 | Dekock et al. | 455/456.2 |
| 2009/0287404 | A1 * | 11/2009 | DeKock et al. | 701/117 |
| 2010/0322516 | A1 * | 12/2010 | Xu et al. | 382/173 |
| 2011/0015853 | A1 * | 1/2011 | DeKock et al. | 701/200 |
| 2012/0130625 | A1 * | 5/2012 | Srivastava | 701/119 |
| 2012/0194357 | A1 * | 8/2012 | Ciolli | 340/936 |
| 2013/0100286 | A1 * | 4/2013 | Lao | 348/148 |

OTHER PUBLICATIONS

Jerbi M., et al,. "An Infrastructure-Free Traffic Information System for Vehicular Networks", VTC, Proceedings of the 66th IEEE Vehicular Technology Conference, 2007, pp. 2086-2090.

Lozano A., et al., "An algorithm for the recognition of levels of congestion in road traffic problems", Mathematics and Computers in Simulation 79, 2009, pp. 1926-1934, Elseiver B.V., ScienceDirect.

Nadeem T., et al., "Traffic View: A scalable Traffic Monitoring System", Proceedings of the 2004 IEEE International Conference on Mobile Data Management (MDM), Jan. 19-22, 2004, pp. 1-14.

Stefano, L., et al., "Evaluation of Inductive-Loop Emulation Algorithms for UTC Systems", Department of Electronics Computer Science and Systems (DEIS), in Proc. of Sixth Intl Conference on Control, Automation, Robotics and Computer Vision (ICARCV), 2000, pp. 1-4.

Ozkurt, C., et al., "Automatic Traffic Density Estimation and Vehicle Classification for Traffic Surveillance Systems Using Neural Networks", Mathematical and Computational Applications, vol. 14, No. 3, 2009, pp. 187-196, Association for Scientific Research.

Li., Z., et al., "On Traffic Density Estimation with a Boosted SVM Classifier", Digital Computing: Techniques and Applications, IEEE Computer Society, 2008, pp. 117-123.

Wen., Y., et al., "Missing Data Treatment and Data Fusion Toward Travel Time Estimation for ATIS", Journal of the Eastern Asia Society for Transportation Studies, vol. 6, 2005, pp. 2546-2560.

Tiwari G., et al., "Traffic planning for non-homogeneous traffic", Sadhana, vol. 32, Part 4, Aug. 2007, pp. 309-328.

* cited by examiner

SYSTEM AND METHOD FOR ON-ROAD TRAFFIC DENSITY ANALYTICS USING VIDEO STREAM MINING AND STATISTICAL TECHNIQUES

This application claims the benefit of Indian Patent Application Filing No. 3243/CHE/2011, filed Sep. 20, 2011, which is hereby incorporated by reference in its entirety.

FIELD

The invention relates generally to the field of on-road traffic congestion control. In particular, the invention relates to a method and system for estimating computer vision based traffic density at any instant of time for multiple surveillance cameras.

BACKGROUND

Traffic density and traffic flow are important inputs for an intelligent transport system (ITS) to better manage traffic congestion. Presently, these are obtained through loop detectors (LD), traffic radars and surveillance cameras. However, installing loop detectors and traffic radars tends to be difficult and costly. Currently, a more popular way of circumventing this is to develop a Virtual Loop Detector (VLD) by using video content understanding technology to simulate behavior of a loop detector and to further estimate the traffic flow from a surveillance camera. But attempting to obtain a reliable and real-time VLD under changing illumination and weather conditions can be difficult.

Streaming video is defined as continuous transportation of images via Internet and displayed at the receiving end that appears as a video. Video streaming is the process where packets of data in continuous form are provided as input to display devices. Video player takes the responsibility of synchronous processing of video and audio data. The difference between streaming and downloading video is that in downloading video, the video is completely downloaded and no operations can be performed on the file while it is being downloaded. The file is stored in the dedicated portion of a memory. In streaming technology, the video is buffered and stored in a temporary memory, and once the temporary memory is cleared the file is deleted. Operations can be performed on the file even when the file is not completely downloaded.

The main advantage of video streaming is that there is no need to wait for the whole file to be downloaded and processing of the video can start after receiving first packet of data. On the other hand, streaming a high quality video is difficult as the size of high definition video is huge and bandwidth may not be sufficient. Also, the bandwidth has to be good so that the video flow is continuous. It can be safely assumed that for video files of smaller size, downloading technology will provide better results, whereas for larger files the streaming technology is more suitable. Still, there is scope for improvement in streaming technology, by finding an optimized method to stream a high definition video with smaller bandwidth through the selection of key frames for further operations.

Stream mining is a technique to discover useful patterns or patterns of special interest as explicit knowledge from a vast quantity of data. A huge amount of multimedia information including video is becoming prevalent as a result of advances in multimedia computing technologies and high-speed networks. Due to its high information content, extracting video information from continuous data packets is called video stream mining. Video stream mining can be considered subfields of data mining, machine learning and knowledge discovery. In mining applications, the goal of a classifier is to predict the value of the class variable for any new input instance provided with adequate knowledge about class values of previous instances. Thus, in video stream mining, a classifier is trained using the training data (class values of previous instances). The mining process can prove to be ineffective if samples are not a good representation of class value. To get good results from classifier, therefore, the training data should include majority of instance that a class variable can possess.

Heavy traffic congestion of vehicles, mainly during peak hours, creates problems in major cities all around the globe. The ever-increasing amount of small to heavyweight vehicles on the road, poorly designed infrastructure, and ineffective traffic control systems are major causes for traffic congestion. Intelligent transportation system (ITS), with scientific and modern techniques, is a good way to manage the vehicular traffic flows in order to control traffic congestion and for better traffic flow management. To achieve this, ITS takes estimated on-road density as input and analyzes the flow for better traffic congestion management.

One of the most used technologies for determination of traffic density is the Loop Detector (LD) (Stefano et al., 2000). These LDs are placed at the crossings and at different junctures. Once any vehicle passes over, the LD generates signals. Signals from all the LDs placed at crossings are combined and analyzed for traffic density and flow estimation. Recently, a more popular way of circumventing automated traffic analyzer is by using video content understanding technology to estimate the traffic flow from a set of surveillance cameras (Lozano, et. al., 2009; Li, et. al., 2008). Because of low cost and comparatively easier maintenance, video-based systems with multiple CCTV (Closed Circuit Television) cameras are also used in ITS, but mostly for monitoring purpose (Nadeem, et. al., 2004). Multiple screens displaying the video streams from different location are displayed at a central location to observe the traffic status (Jerbi, et. al., 2007; Wen, et. al., 2005; Tiwari, et. al., 2007). Presently, this monitoring system involves the manual task of observing these videos continuously or storing them for lateral use. It will be apparent that in such a set-up, it is very difficult to recognize any real time critical happenings (e.g., heavy congestions).

Recent techniques such as loop detector have major disadvantages of installation and proper maintenance associated with them. Computer vision based traffic application is considered a cost effective option. Applying image analysis and analytics for better congestion control and vehicle flow management in real time has multiple hurdles, and most of them are in research stage. A few of the important limitations for computer vision based technology are as follows:

a. Difficulty in choosing the appropriate sensor for deployment.
b. Trade-off between computational complexity and accuracy.
c. Semantic gap between image content and perception poses challenges to analyze the images, hence it is difficult to decide which feature extraction techniques to use.
d. Finding a reliable and practicable model for estimating density and making global decision.

The major vision based approach for traffic understanding and analyses are object detection and classification, foreground and back ground separation, and local image patch (within ROI) analysis. Detection and classification of moving objects through supervised classifiers (e.g. AdaBoost, Boosted SVM, NN etc.) (Li, et. al., 2008; Ozkurt & Camci, 2009) are efficient only when the object is clearly visible. These methods are quite helpful in counting vehicles and tracking them individually, but in a traffic scenario that involved high overlapping of objects, most of the occluded objects are partially visible and very low object size makes these approaches impracticable. Many researchers tried to separate foreground from background in video sequence either by temporal difference or optical flow (Ozkurt & Camci, 2009). However, such methods are sensitive to illumination change, multiple sources of light reflections and weather conditions. Thus, the vision based approach for automation has its own advantages over other sensors in terms of cost on maintenance and installment process. Still the practical challenges need high quality research to realize it as solution. Occlusion due to heavy traffic, shadows (Janney & Geers, 2009), varied source of lights and sometimes low visibility (Ozkurt & Camci, 2009) makes it very difficult to predict traffic density and flow estimation.

Given low object size, high overlapping between objects and broad field of view in surveillance camera setup, estimation of traffic density by analyzing local patches within the given ROI is an appealing solution. Further, levels of congestion constitute a very important source of information for ITS. This is also used for estimation of average traffic speed and average congestion delay for flow management between stations.

Based on the above mentioned limitations, there is a need for a method and system to estimate vehicular traffic density and apply analytics to monitor and manage traffic flow.

SUMMARY OF THE INVENTION

The present invention relates to a method and a system for analyzing on-road traffic density. In various embodiments of the present invention, the method involves allowing a user to select a video image capturing device from a pool of video image capturing devices, where the video image capturing devices can include a surveillance camera placed at junctions to capture a traffic scenario. The method also allows the user to select coordinates in one of the video image frames captured by the selected video image capturing device to form a closed region of interest (ROI). The ROI is processed by segmenting the ROI into one or more overlapping sub-windows and converting the sub-windows into feature vectors by applying a textural feature extraction technique. The method further includes generating a traffic classification confidence value or a no-traffic classification confidence value for each feature vector to classify each sub-window as having less or high traffic by a traffic density classifier. Traffic density value of the video image frame is computed based on the number of sub-windows with high traffic and total number of sub-windows within the ROI.

The method further includes comparing the traffic density value of the video image frame with a first set of threshold values to categorize the video image frame as having less, medium or high traffic. The method also includes displaying traffic density values at different instants in a time window to monitor the traffic trend.

The method further includes analyzing the traffic density value to estimate a traffic state at a junction, estimating a travel time between any two consecutive junctions on a route, planning an optimized route between a selected source and destination on the route and analyzing an impact of congestion at one junction on the other junction on the route.

The present invention also relates to a method for re-training a traffic density classifier with a valid set of classified video image frames upon identifying any misclassified video image frame by utilizing a reinforcement learning technique.

In an embodiment of the present invention, the system for analyzing on-road traffic density includes a user interface which is configured to allow a user to select a video image capturing device from a pool of video image capturing device. The user via the user interface selects an ROI in one of the video image frames captured by the selected video image capturing device. The system includes a processing engine which is configured to segment the ROI into one or more overlapping sub-windows. The processing engine is further configured to utilize a textural feature extraction technique to convert the sub-windows into feature vectors.

The system further includes a traffic density classification engine that generates a traffic classification confidence value or no-traffic classification confidence value for each feature vector to classify each sub-window as having less or high traffic, where the traffic density classification engine is pre-trained with manually selected video image frame with and without the presence of traffic objects.

The traffic density classification engine further computes the traffic density value based on the number of sub-windows with high traffic and total number of sub-windows within the ROI and compares the traffic density value with a first set of threshold values to categorize the video image frame as having high, medium or low traffic. The system also includes a traffic density analyzer, which analyzes the traffic density value to estimate a traffic state at a junction, estimate a travel between two consecutive junctions in a route, to plan an optimized route between a selected source and destination pair and to analyze an impact of congestion at one junction on another junction on the route.

The present invention also relates to a system for re-training the traffic density classification engine upon identifying any misclassified video image frames by utilizing a reinforcement learning engine.

DRAWINGS

These and other features, aspects, and advantages of the present invention will be better understood when the following detailed description is read with reference to the accompanying drawings in which like characters represent like parts throughout the drawings, wherein.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

The present invention is a computer vision based solution for traffic density estimation and analytics for future generation of transport industry. Increasing traffic in all cities create trouble in daily life starting from the longer time duration on road while travelling from home to office and other way also, to increase in number of accidents happened each year and, of course, risk involved in safety of the travelers. The present invention may be added to the recent Intelligent Transport System (ITS) and can enhance its functionality for better flow control and traffic management. The present invention is also applicable to autonomous navigation (e.g. vehicle or robots) in cluttered scenarios.

Figure 1:
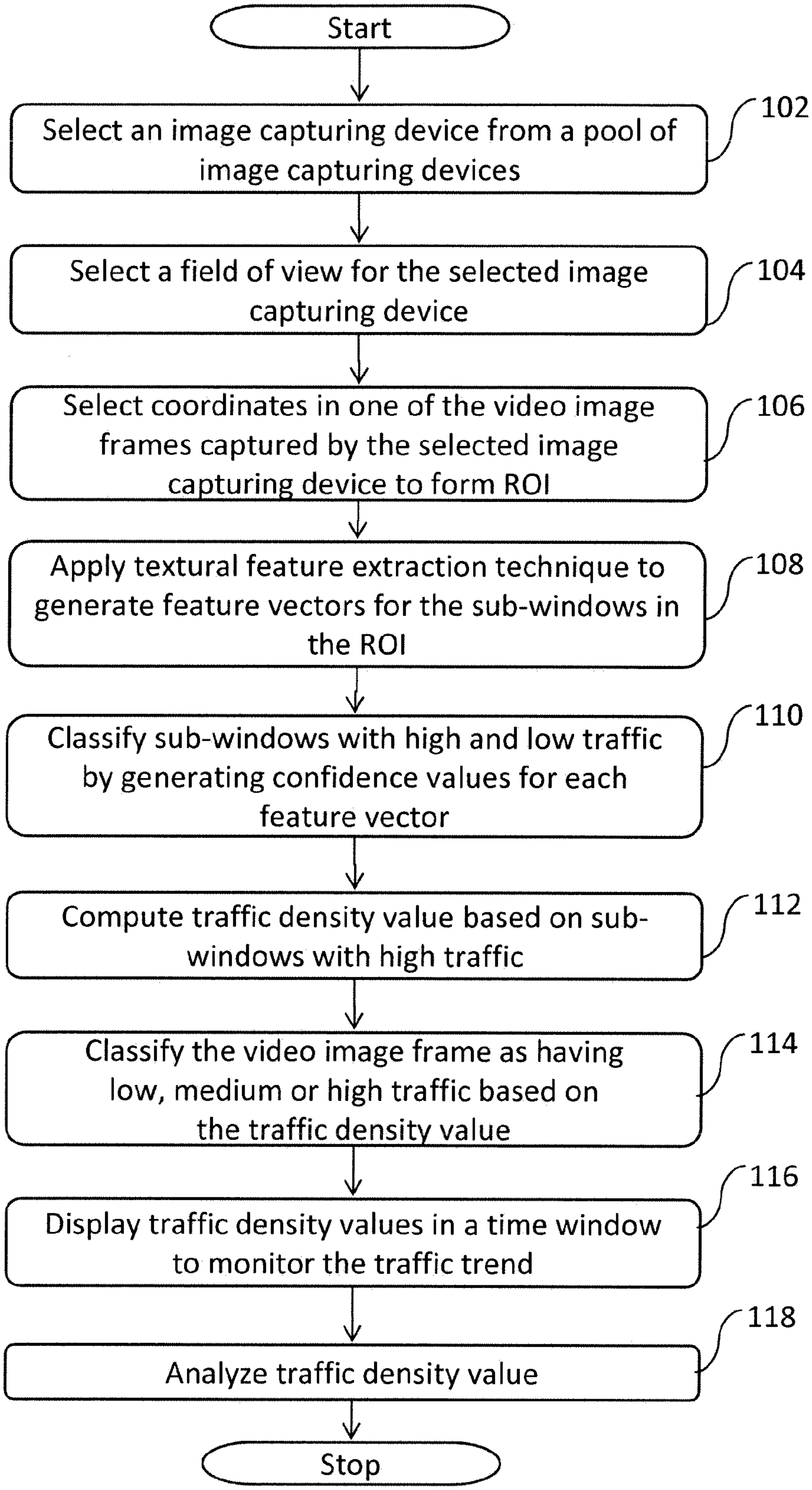
FIG. 1 shows a flow chart describing a method for analyzing an on-road traffic density, in accordance with various embodiments of the present invention.

FIG. 1 illustrates a flow chart depicting method steps involved in analyzing an on-road traffic density, in accordance with various embodiments of the present invention.

In various embodiments of the present invention, the method for analyzing an on-road traffic density comprises selecting an image capturing device from a pool of image capturing devices by a user at step 102. Image capturing devices such as surveillance cameras are placed at different locations in a city to monitor on-road traffic patterns and aid commuters to initiate immediate response based on the on-road traffic patterns. At step 104, a field of view for the selected image capturing device is selected by the user.

The method further comprises selecting coordinates in one of the video image frames captured by the selected image capturing device at step 106, such that the coordinates form a closed ROI, where the ROI can be a convex shaped polygon.

The method further comprises segmenting the ROI into one or more overlapping sub-windows and converting the sub-windows to one or more feature vectors by applying a textural feature extraction technique at step 108.

At step 110, traffic or no-traffic confidence values are generated for each of the feature vectors by a traffic density classifier to classify the sub-windows as having high or low traffic.

The method thereafter at step 112 comprises in computing a traffic density value for the ROI based on the sub-windows having high traffic based on the formula:

Traffic Density(%)=(No. of sub-windows with traffic/Total number of sub-windows within ROI)*100

The method further comprises classifying the video image frame as having low, medium or high traffic based on the traffic density value at step 114.

At step 116, the traffic density values for a time window to monitor the traffic trend are displayed.

The method further includes analyzing the traffic density value to estimate a traffic state at a junction, estimating a travel time between any two consecutive junctions on a route, planning an optimized route between a source and destination pair and analyzing an impact of congestion at one junction on another junction in the route at step 118.

Figure 2:
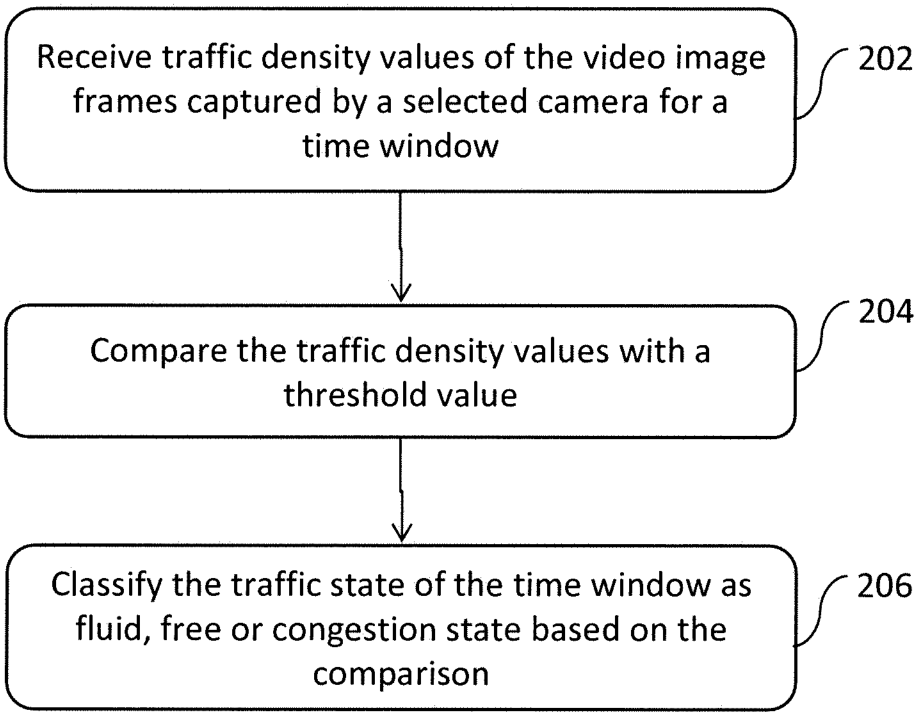
FIG. 2 shows a flow chart describing steps for estimating a traffic state of a junction in a route, in accordance with various embodiments of the present invention.

FIG. 2 illustrates a flow chart depicting method steps for estimating a traffic state of a junction in a route, in accordance with various embodiments of the present invention.

The method comprises receiving from a database the traffic density values of the video image frames captured by the selected video image capturing device for a time window at step 202. The database is updated with the traffic density values for the corresponding video image frames at predefined time intervals.

At step 204, the traffic density values are compared with a second set of threshold values, where the second set of threshold values include a maximum threshold value and a minimum threshold value.

The method thereafter, at step 206, classifies the traffic state of the time window into one of the plurality of predefined traffic states. In accordance with an embodiment of the present invention, the predefined traffic states comprise a) free state if the traffic density values in the time window is below a minimum threshold value of the second set of threshold values.
b) congestion state if the traffic density values in the time window are above a maximum threshold value of the second set of threshold values.
c) fluid state if the traffic density values in the time window are between the maximum and minimum threshold values of the second set of threshold values.

Figure 3:
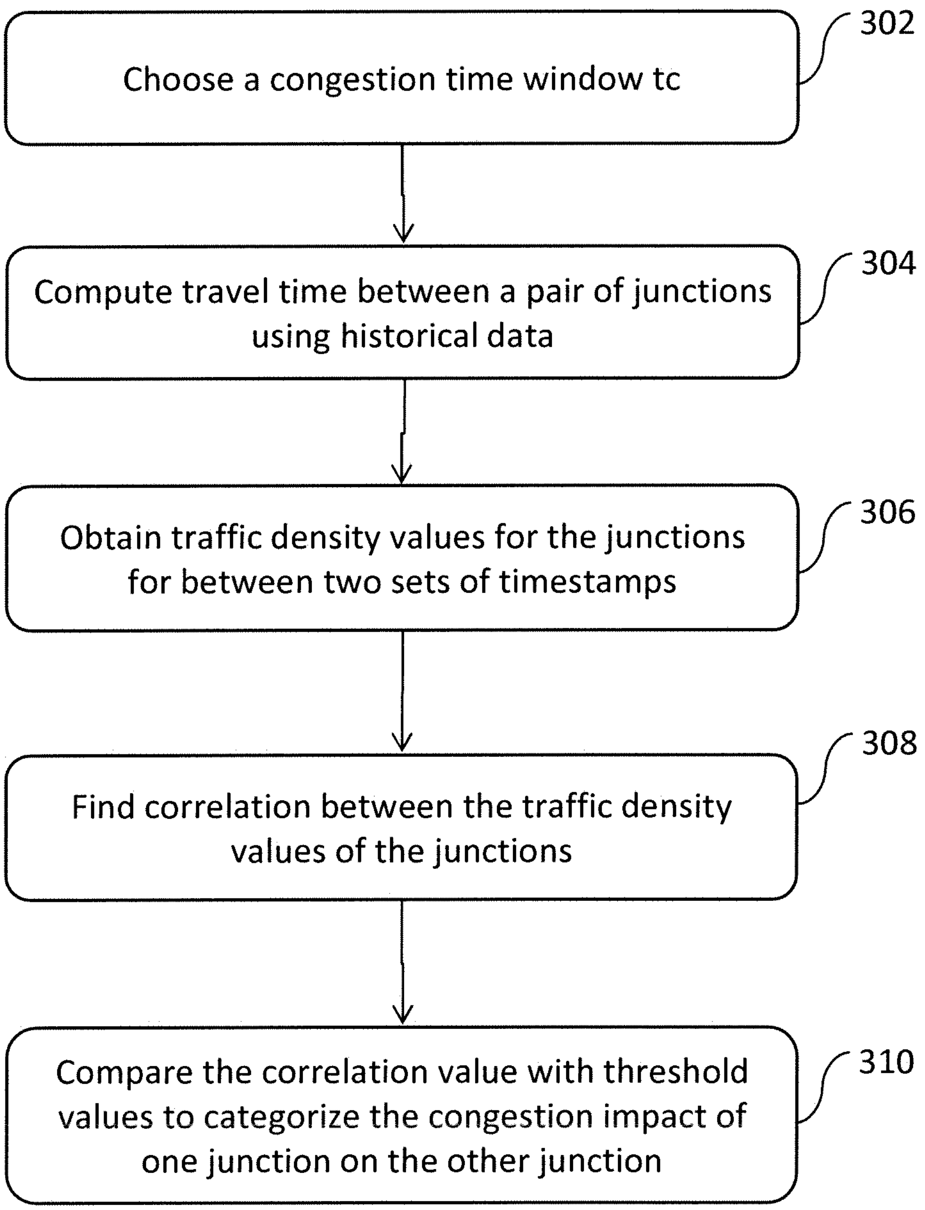
FIG. 3 is a flowchart describing steps for analyzing an impact of congestion at one junction on another junction in a route, in accordance with various embodiments of the present invention.

FIG. 3 illustrates a flow chart depicting the method steps for analyzing an impact of congestion at one junction on another junction in a route, in accordance with various embodiments of the present invention. The method comprises enabling a user to choose a congestion time window $t_c$ at step 302. At step 304, a travel time $t_1$ between a pair of junctions $J_1$ and $J_2$ is computed using historical data. At step 306, traffic density values $D_1$ for the junction $J_1$ between timestamps t and t+tc, and traffic density values $D_2$ for the junction $J_2$ between timestamps $t+t_1$ and $t+t_1+tc$, are obtained from the database, where t is the time at any given instant.

The method further comprises in identifying a correlation value between the traffic density values $D_1$ and $D_2$ at step 308.

The method further comprises comparing the correlation value with a third set of threshold values to categorize the impact of congestion as high, medium, low and negative at step 310. The details of these different categories are provided below.

a) The congestion impact at $J_2$ due to the traffic on $J_1$ is low when the correlation value is below a minimum threshold value of the third set of threshold values.
b) The congestion impact at $J_2$ due to the traffic on $J_1$ is high when the correlation value is above a maximum threshold value of the third set of threshold values.
c) The congestion impact at $J_2$ due to the traffic on $J_1$ is medium when the congestion value is between the maximum and minimum threshold values of the third set of threshold values.
d) The congestion impact is classified as negative indicating there is a congestion impact at $J_1$ due to the traffic in $J_2$.

Figure 4:
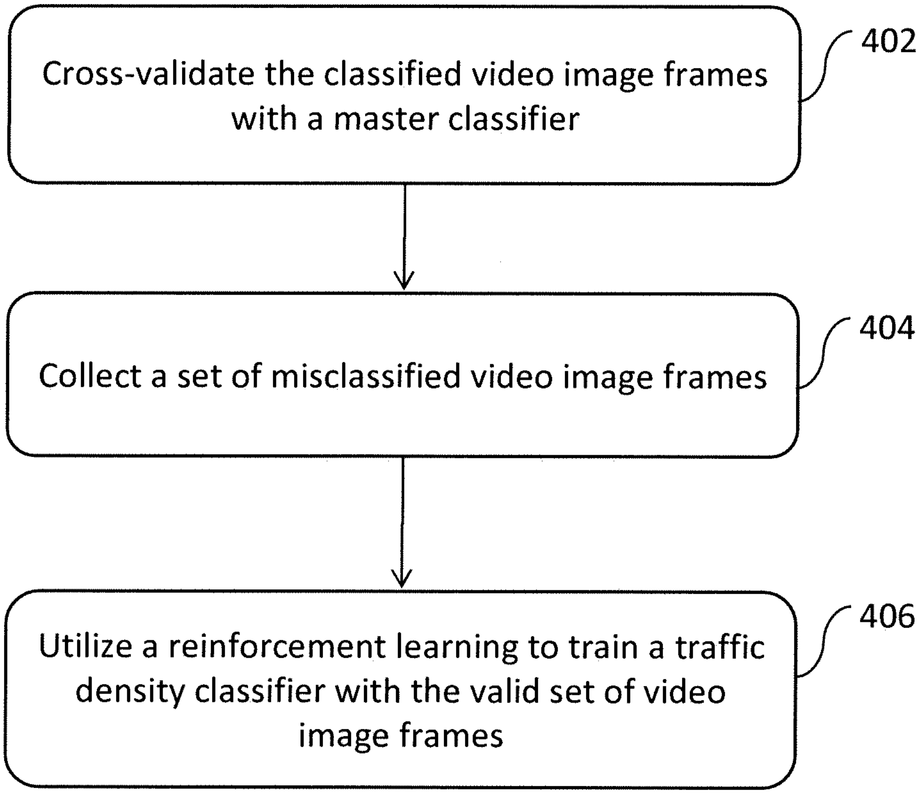
FIG. 4 is a flowchart describing a method for re-training a traffic density classification engine, in accordance with various embodiments of the present invention.

FIG. 4 illustrates a flowchart depicting the method steps for re-training a traffic density classification engine, in accordance with various embodiments of the present invention. The method comprises cross-validating the classified video image frames with a master classifier to identify the misclassified video image frames at step 402, wherein the master classifier is pre-trained with video image frames of multiple texture and color features.

The method utilizes a reinforcement learning technique at step 406 to train the traffic density classifier with a valid set of video image frames corresponding to predefined settings of the image capturing device. In an embodiment, the predefined settings of the image capturing device may include view angle, distance, and height.

Figure 5:
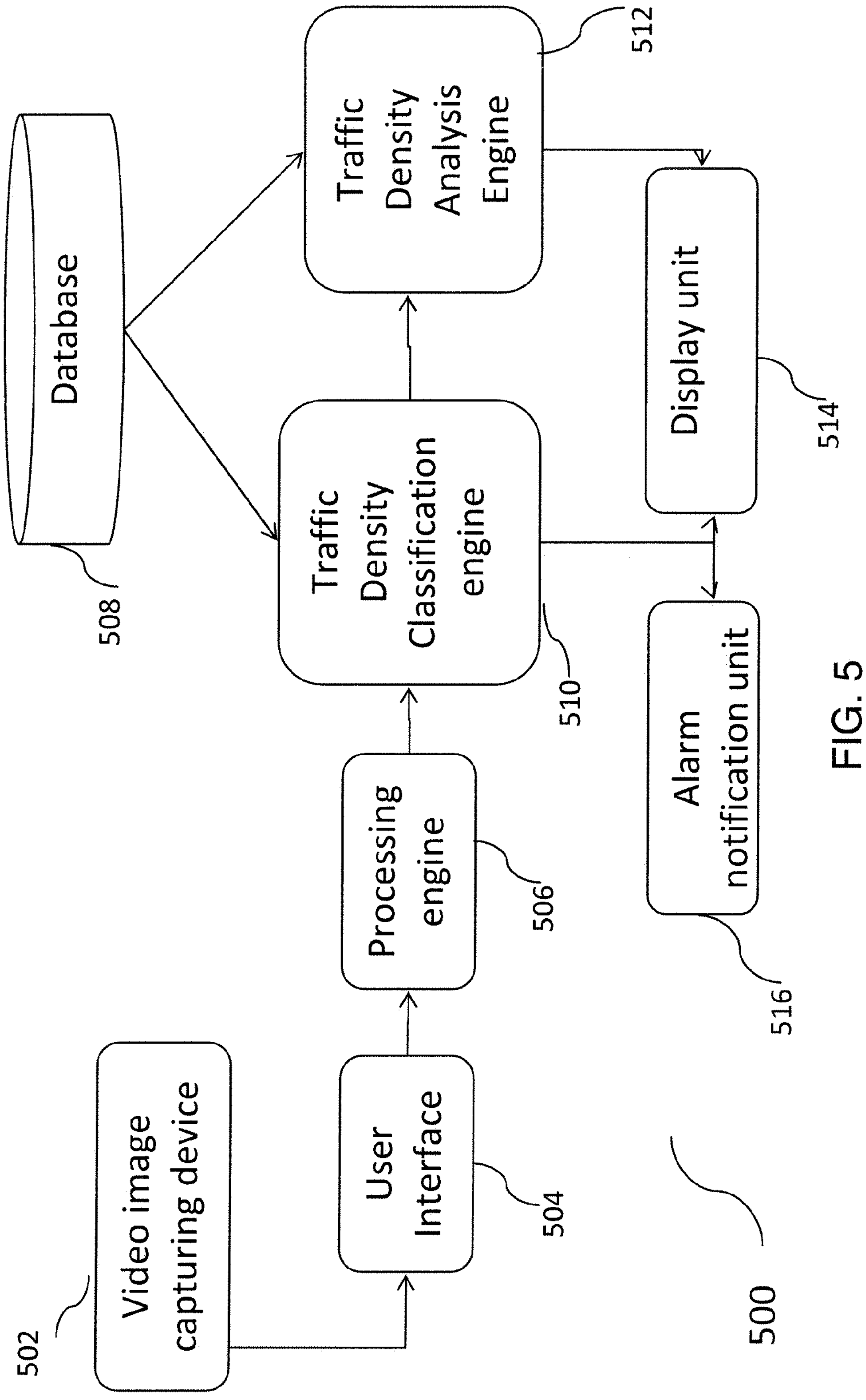
FIG. 5 is a block diagram depicting a system for traffic density estimation and on-road traffic analytics, in accordance with various embodiments of the present invention.

FIG. 5 is a block diagram depicting a system 500 for traffic density estimation and on-road traffic analytics, in accordance with various embodiments of the present invention.

In various embodiments of the present invention, the system 500 includes a pool of video image capturing devices 502, a user interface 504, a processing engine 506, a database 508, a traffic density calculation engine 510, a traffic density analysis engine 512, a display unit 514 and an alarm notification unit 516.

Video image capturing devices 502 may be placed at different location/junctions in a city to extract meaningful insights pertaining to traffic from video frames grabbed from video streams. Video image capturing devices 502 may include a surveillance camera.

The system 500 includes user interface 504, via which a user selects one of the video image capturing devices from the pool of video image capturing devices 502. The user also selects coordinates in one of the video image frames captured by the selected video image capturing device by using the user interface 504, such that the coordinates form a closed ROI. As used in this disclosure, the ROI is a flexible convex shaped polygon that covers the best location in a field of view of the video image capturing device.

Processing engine 506 preprocess the image patches in the ROI by enhancing the contrast of the image patches, which helps in processing the shadowed region adequately. The processing engine 506 further smoothens the image patches in the ROI to reduce the variations in the image patches. Contrast enhancement and smoothing improve gradient feature extraction for variations of intensity of light source, thus ensuring that the system 500 operates well in low visibility and noisy scenarios.

The processing engine 506 also segments the ROI into one or more overlapping sub-windows, where the size of each sub-window is W×W with overlapping of D pixels. The processing engine 506 further utilizes a textural feature extraction technique to convert the sub-windows into feature vectors.

In various embodiments, the textural feature extraction technique utilizes a histogram of an Oriented Gradient descriptor in the sub-windows while converting the sub-windows into feature vectors to represent the variation/gradient among the neighboring pixel values.

Traffic density classification engine 510 utilizes a nonlinear interpolation to provide weightage to the sub-windows based on the distance of the sub-windows from the field of view of the selected video image capturing device for generating a traffic classification confidence value or no-traffic classification confidence value for each feature vector.

The traffic density classification engine 510 also computes a traffic density value for the image frame based on the number of sub-windows with high traffic and total number of sub-windows within the ROI. In accordance with an embodiment of the present invention, Traffic density classification engine 510 computes the traffic density value using the formula:

Traffic Density(%)=(No. of sub-windows with traffic/Total number of sub-windows within ROI)*100

The traffic density classification engine 510 compares the traffic density value with a first set of threshold values T1 and T2, where T1 is a minimum threshold value and T2 is a maximum threshold value. The thresholds are predefined by an entity involved in analyzing the on-road traffic states The traffic density classification engine 510 further categorizes the video image frame as having a. low traffic if the traffic density value is below $T_1$,
b. high traffic if the traffic density value is above the $T_2$, and
c. medium traffic if the traffic density value is between $T_1$ and $T_2$.

It should be noted that the traffic density classification engine 510 may be pre-trained with a number of manually selected video image data with and without the presence of traffic objects.

Display unit 514 displays traffic density values at different instants in a time window to enable monitoring a traffic trend at a given location or junction, whereas alarm notification unit 516 generates an alarm message when the traffic density value exceeds the first set of threshold values.

System 500 also includes traffic density analysis engine 512, which combines the traffic density values from individual image capturing devices to perform the following major functions:

a. Estimate a traffic state at a junction;
b. Estimate a travel time between any two consecutive junctions on a route;
c. Plan an optimized route between a selected source and destination pair on the route; and
d. Analyze an impact of congestion at one junction on another junction on the route.

Each of these functions will now be explained in detail in subsequent paragraphs.

Junction Traffic State Estimation

The traffic density analysis engine 512 receives traffic density values of the video image frames captured by the selected video image capturing device for a time window from database 508. The traffic density analysis engine 512 compares the traffic density values with a second set of threshold values to classify the traffic state of the time window into a set of predefined traffic states. The predefine traffic states may include a free state, a congestion state and a fluid state.

In accordance with various embodiments, the traffic state of the time window is classified as being a) free state if the traffic density values in the time window is below a minimum threshold value of the second set of threshold values;
b) congestion state if the traffic density values in the time window are above a maximum threshold value of the second set of threshold values; and
c) fluid state if the traffic density values in the time window are between the maximum and minimum threshold values of the second set of threshold values.

Travel Time Estimation

The traffic density analysis engine 512 estimates the travel time between any two consecutive junctions on a route by adding the time taken to travel between the consecutive junctions and the traffic states at the junctions at different instants in time.

Optimized Route Planning

The traffic density analysis engine 512 plans an optimized route between a selected source and a selected destination by finding an optimum path between the selected source and the selected destination using one of static estimation and dynamic estimation.

As will be understood, in static estimation the best route may be identified based on the least time taken to reach the selected destination and the traffic density values of the junctions between the selected source and the selected destination, whereas in dynamic estimation, the best route may be identified by utilizing one of graph theory algorithms, such as Kruskal's algorithm and Dijkstra's algorithm.

Congestion Impact Analysis

The traffic density analysis engine 512 analyzes an impact of the congestion at one junction on another junction by:

a) choosing a congestion time window $t_c$;

b) computing a duration of travel time $t_1$ between a pair of junctions $J_1$ and $J_2$ from historical data;

c) obtaining traffic density values $D_1$ for junction $J_1$ between timestamps t and $t+t_c$, and traffic density values $D_2$ for junction $J_2$ between timestamps $t+t_1$ and $t+t_1+t_c$, where t is the time at any given instant d) finding a correlation value between the traffic density values $D_1$ and $D_2$; and e) comparing the correlation value with a third set of threshold values to categorize a congestion impact as one of high, medium, low and negative.

Further, the traffic density analysis engine 512 categorizes the congestion impact at $J_2$ on $J_1$ as a. low when the correlation value is below a minimum threshold value of the third set of threshold values; and b. high when the correlation value is above a maximum threshold value of the third set of threshold values.

The traffic density analysis engine 512 further categorizes the congestion impact is at $J_1$ due to the traffic at $J_2$ when the correlation value is negative.

Figure 6:
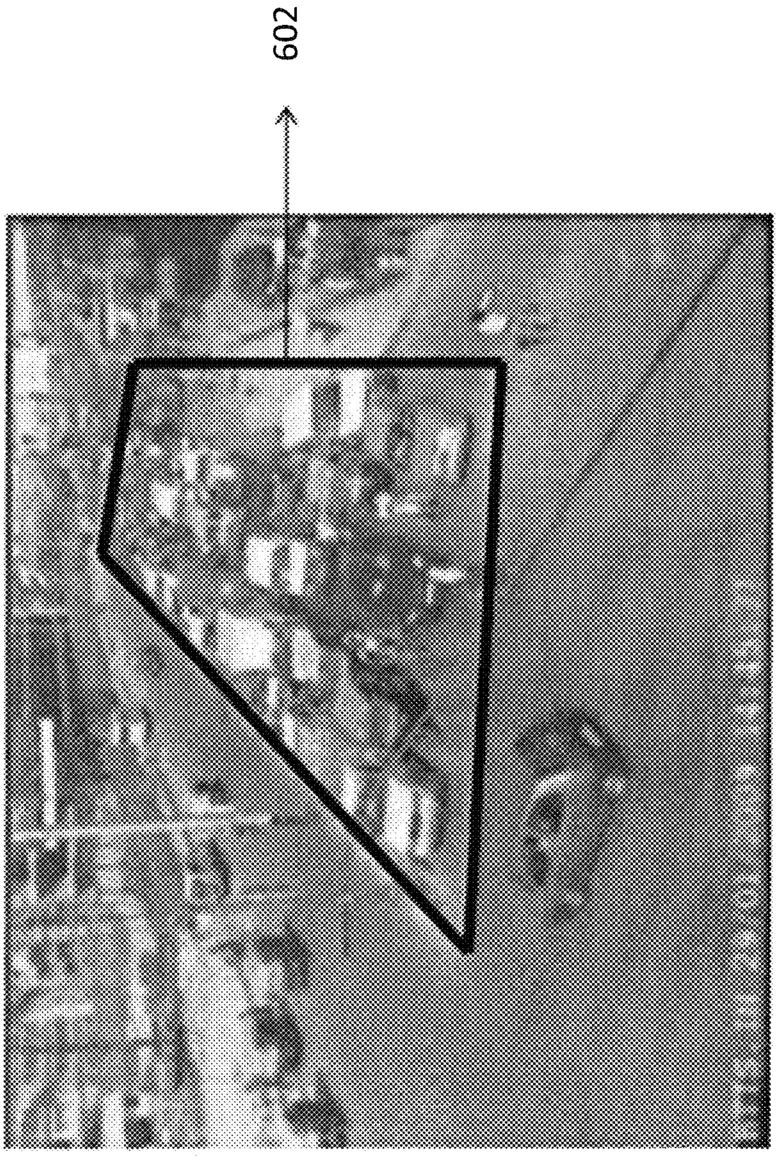
FIG. 6 is an illustration depicting a region of interest selection.

FIG. 6 illustrates a screenshot depicting the selection of a region of interest 602 in a video image frame, wherein the region of interest 602 has a group of coordinates that form a flexible convex shaped polygon. As mentioned earlier, the ROI is the region of the video image on which the system for traffic density estimation and on-road traffic analytics operates. It should be noted that while there is no limit on the number of coordinates, the coordinates should be be chosen such that the entire traffic congestion scene is covered.

Figure 7:
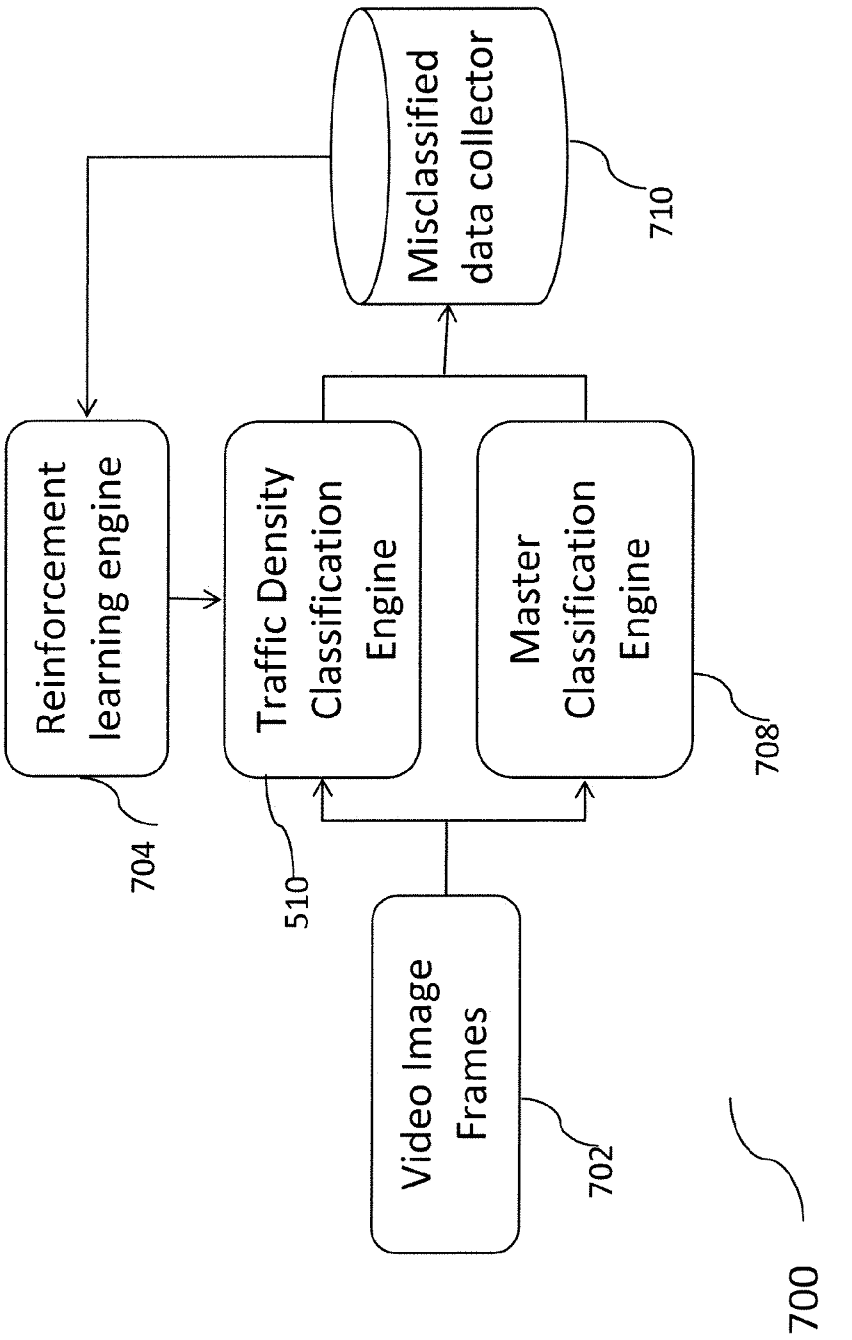
FIG. 7 is a block diagram depicting a system for re-training a traffic density classification engine, in accordance with various embodiments of the present invention.

FIG. 7 is a block diagram depicting a system 700 for re-training a traffic density classification engine, in accordance with various embodiments of the present invention. System 700 includes video image frames 702, a reinforcement learning engine 704, a traffic density classification engine 510, a master classification engine 708, and a misclassified data collector 710.

System 700 retrains traffic density classification engine 510 at predefined intervals of time to make the traffic density classification engine a robust engine against the changing scenarios and camera settings.

Misclassified data collector 710 collects a set of misclassified video image frames of a video image capturing device from among a pool of video image capturing devices, such as video image capturing devices 502.

In an embodiment, the set of misclassified video image data is obtained by cross-validating the classified video image frames with master classification engine 708, where the master classifier is trained with video image data of multiple textures and color features.

Reinforcement learning engine 704 trains the traffic density classification engine 510 with a valid set of video image data for corresponding predefined settings of video image capturing devices 502, where the predefined settings of the image capturing device may include view angle, distance, and height.

Exemplary Computing Environment

Figure 8:
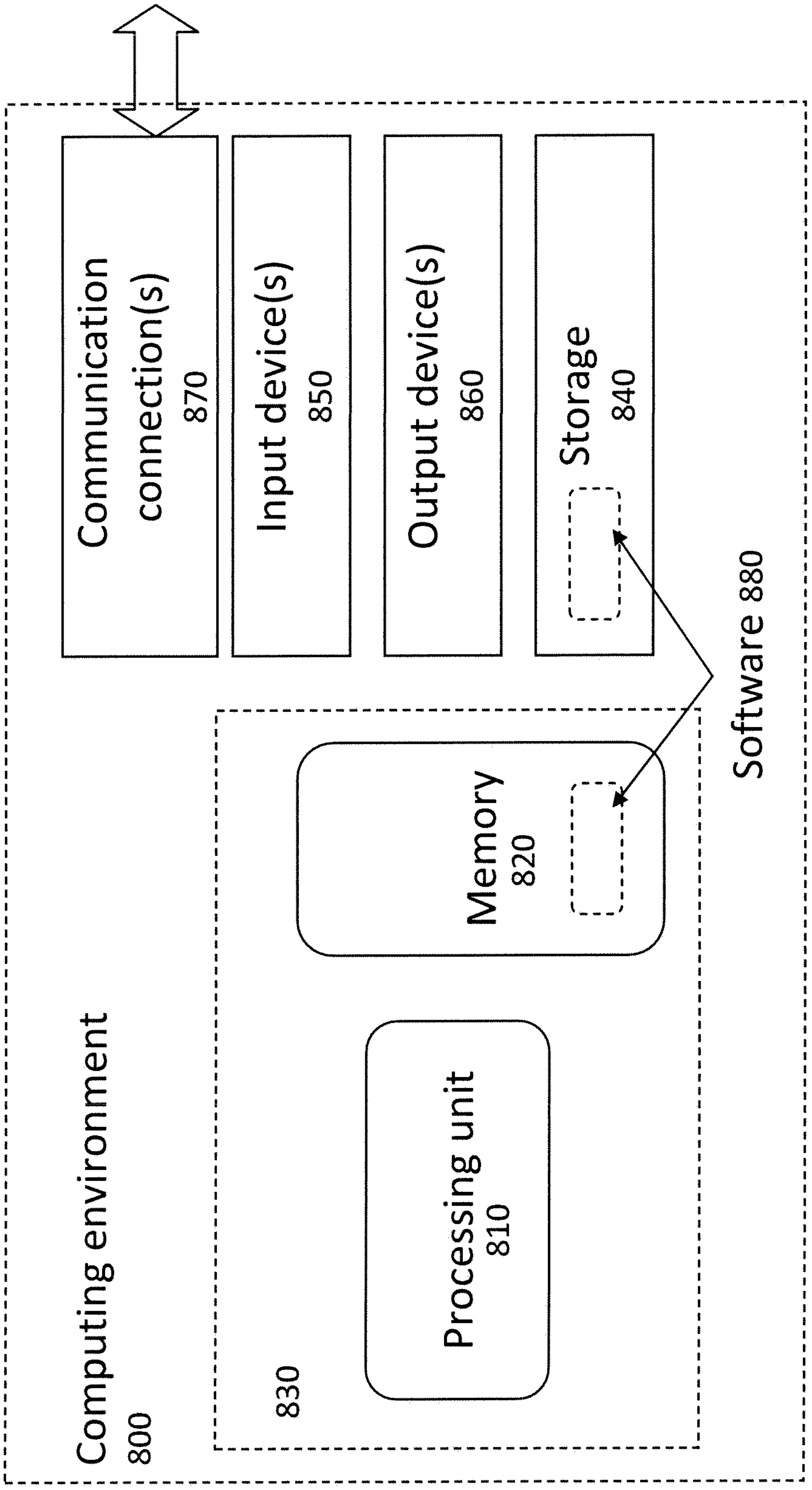
FIG. 8 illustrates a generalized example of a computing environment 800.

One or more of the above-described techniques can be implemented in or involve one or more computer systems. FIG. 8 illustrates a generalized example of a computing environment 800. The computing environment 800 is not intended to suggest any limitation as to scope of use or functionality of described embodiments.

With reference to FIG. 8, the computing environment 800 includes at least one processing unit 810 and memory 820. In FIG. 8, this most basic configuration 830 is included within a dashed line. The processing unit 810 executes computer-executable instructions and may be a real or a virtual processor. In a multi-processing system, multiple processing units execute computer-executable instructions to increase processing power. The memory 820 may be volatile memory (e.g., registers, cache, RAM), non-volatile memory (e.g., ROM, EEPROM, flash memory, etc.), or some combination of the two. In some embodiments, the memory 820 stores software 880 implementing described techniques.

A computing environment may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The storage 840 may be removable or non-removable, and includes magnetic disks, magnetic tapes or cassettes, CD-ROMs, CD-RWs, DVDs, or any other medium which can be used to store information and which can be accessed within the computing environment 800. In some embodiments, the storage 840 stores instructions for the software 880.

The input device(s) 850 may be a touch input device such as a keyboard, mouse, pen, trackball, touch screen, or game controller, a voice input device, a scanning device, a digital camera, or another device that provides input to the computing environment 800. The output device(s) 860 may be a display, printer, speaker, or another device that provides output from the computing environment 800.

The communication connection(s) 870 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 800, computer-readable media include memory 820, storage 840, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. method for analyzing on-road traffic density comprising:

receiving, by a traffic management computing device, a user selection of a video image capturing device from among a plurality of video image capturing devices;

receiving, by the traffic management computing device, a user selection of coordinates in one of one or more video image frames of an on-road traffic scenario captured by the selected video image capturing device such that the coordinates form a closed region of interest;

the segmenting, by the traffic management computing device, the region of interest into one or more overlapping sub-windows;

converting, by the traffic management computing device, the one or more overlapping sub-windows into one or more feature vectors through a textural feature extraction technique;

generating, by the traffic management computing device, at least a traffic confidence value or no traffic confidence value for each of the feature vectors to classify the sub-windows as having a high traffic value or a low traffic value by a traffic density classifier;

computing, by the traffic management computing device, at least a traffic density value depending on a number of the sub-windows with a high traffic value and a total number the of sub-windows within the region of interest;

comparing, by the traffic management computing device, the traffic density value with a first set of threshold values to categorize the video image frame as having low, medium or high traffic; and displaying, by the traffic management computing device, traffic density values at different instants in a time window to enable monitoring of a traffic trend.

2. The method according to claim 1, further comprising, based on the computed traffic density value:

estimating, by the traffic management computing device, a traffic state at a junction;

estimating, by the traffic management computing device, a travel time between any two consecutive junctions on a route, wherein the route includes a plurality of junctions;

determining, by the traffic management computing device, an optimized route between a selected source and a selected destination on the route; and analyzing, by the traffic management computing device, an impact of congestion at one junction on another junction on the route.

3. The method according to claim 2, wherein estimating the traffic state at a junction comprises:

receiving, by the traffic management computing device, traffic density values of the video image frames captured by the selected video image capturing device for a time window from a database; and comparing, by the traffic management computing device, the traffic density values with a second set of threshold values to classify the traffic state of the time window into one of a plurality of predefined traffic states, wherein the second set of threshold values include a minimum threshold value and a maximum threshold value.

4. The method according to claim 3, wherein the plurality of predefined traffic states comprise a free state or a fluid state or a congestion state.

5. The method according to claim 4, wherein the traffic state of the time window is classified as:

the free state when the traffic density values in the time window are below the minimum threshold value of the second set of threshold values;

the fluid state when the traffic density values in the time window are between the maximum and minimum threshold values of the second set of threshold values, and the congestion state when the traffic density values in the time window are above the maximum threshold value of the second set of threshold values.

6. The method according to claim 2, wherein estimating the travel time comprises:

adding, by the traffic management computing device, a time taken to travel between the any two consecutive junctions on the route and the traffic states between the any two consecutive junctions on the route at different instants of time.

7. The method according to claim 2, wherein determining the optimized route between the selected source and the selected destination comprises:

identifying, by the traffic management computing device, an optimum path between the selected source and the selected destination using one of static estimation or dynamic estimation.

8. The method according to claim 7, wherein the static estimation identifies a best route based on a least amount of time taken to reach the destination and the traffic density values of the junctions between the selected source and the selected destination.

9. The method according to claim 7, wherein the dynamic estimation identifies the best route by utilizing a graph theory algorithm.

10. The method according to claim 2, wherein analyzing the impact of congestion comprises:

selecting, by the traffic management computing device, a congestion time window tc;

computing, by the traffic management computing device, a travel time t1 between a pair of junctions J1 and J2 using historical data;

obtaining, by the traffic management computing device, traffic density values D1 for the junction J1 between timestamps t and t+tc, and traffic density values D2 for the junction J2 between timestamps t+t1 and t+t1+tc, where t is the time at any given instant;

determining, by the traffic management computing device, a correlation value between the traffic density values D1 and D2; and comparing, by the traffic management computing device, the correlation value with a third set of threshold values to categorize the impact of congestion as one of high, medium, low or negative.

11. The method according to claim 10, wherein the third set of threshold values comprises a minimum threshold value below which the congestion impact at J2 on J1 is low and a maximum threshold value above which the congestion impact at J2 on J1 is high.

12. The method according to claim 10, wherein the correlation value is negative when congestion impact is present at J1 due to traffic at J2.

13. The method according to claim 1, further comprising: receiving, by the traffic management computing device, as user selection of one among a plurality of field of views of the selected video image capturing device prior to recieving the user selection of coordinates.

14. The method according to claim 1, wherein the region of interest is a flexible convex shaped polygon.

15. The method according to claim 1, further comprising:

enhancing, by the traffic management computing device, contrast in a shadowed region in the region of interest; and smoothing, by the traffic management computing device, the region of interest for image noise reduction prior to segmentation of the region of interest into sub-windows.

16. The method according to claim 1, wherein the textural feature extraction technique utilizes a histogram of a plurality of Oriented Gradient descriptors in the sub-windows for converting the sub-windows into feature vectors.

17. The method according to claim 1, wherein generating the trafficc confidence value and the no traffic confidence value comprises:

utilizing, by the traffic management computing device, a non-linear interpolation to provide weightage to the sub-windows based on the distance of the sub-windows from a field of view of the selected video image capturing device.

18. The method according to claim 1, wherein the traffic density classifier is pre-trained with a number of manually selected video image data with and without the presence of traffic objects.

19. The method according to claim 1, wherein the first set of threshold values comprise a minimum threshold value below which the traffic density is low and a maximum threshold value above which the traffic density is high.

20. The method according to claim 1, further comprising:

generating, by the traffic management computing device, an alarm message when the traffic density value exceeds the first set of threshold values.

21. A method for re-training a traffic density classifier comprising:

collecting, by a traffic management computing device, a set of misclassified video image frames captured by an image capturing device from among a plurality of image capturing devices; and utilizing, by the traffic management computing device; a reinforcement learning to train the traffic density classifier with a valid set of video image frames corresponding to predefined settings of the image capturing device.

22. The method according to claim 21, wherein collecting the set of misclassified video image frames comprises:

cross-validating, by the traffic management computing device, the classified video image frames with a master classifier, where the master classifier is pre-trained with video image frames of multiple texture and color features.

23. The method according to claim 21, wherein the predefined settings of the image capturing device comprise one or more of a view angle, a distance, or a height.

24. road traffic management computing device comprising:

a processor coupled to a memory and configured to execute programmed instructions stored in the memory, comprising:

receiving a user selection of a video image capturing device from among a plurality of video image capturing devices communicatively coupled to the traffic management computing device:

receiving a user selection of coordinated in one of one or more video image frames of an on-road traffic scenario captured by the selected video image capturing device such that the coordinates form a closed region of interest;

segmenting the region of interest into on or more overlapping sub-windows;

converting the one or more overlapping sub-windows into one or more feature vectors through a textural feature extraction technique;

generating at least a traffic confidence value or no traffic confidence value for each of the feature vectors to classify the sub-windows as having at least a high traffic value or a low traffic value by a traffic density classifier;

computing a traffic density value depending on a number of the sub-windows with a high traffic value and a total number the sub-windows within the region of interest;

comparing the traffic density value with a first set of threshold values to categorize the video image frame as having low, medium or high traffic; and displaying traffic density values at different instants in a time window to enable monitoring of a traffic end.

25. The device according to claim 24, wherein the processor is further configured to execute programmed instructions stored in the memory further comprising:

estimating a traffic state at a junction;

estimating a travel time between any two consecutive junctions on a route, wherein the route includes a plurality of junctions;

determining an optimized route between a selected source and a selected destination on the route; and analyzing an impact of congestion at one junction on another junction on the route.

26. The device according to claim 25, wherein estimating the traffic state at a junction comprises:

receiving traffic density values of the video image frames captured by the selected video image capturing device for a time window from a database;

comparing the traffic density values with a second set of threshold values to classify the traffic state of the time window into one of a plurality of predefined traffic states, wherein the second set of threshold values include a minimum threshold value and a maximum threshold value.

27. The device according to claim 26, wherein the plurality of predefined traffic states comprise a free state, a fluid state or a congestion state.

28. The device according to claim 26, wherein the traffic state of the time window is classified as:

the free state when the traffic density values in the time window are below the minimum threshold value of the second set of threshold values;

the fluid state when the traffic density values in the time window are between the maximum and minimum threshold values of the second set of threshold values; and the congestion state when the traffic density values in the time window are above the maximum threshold value of the second set of threshold values.

29. The device according to claim 25, wherein estimating the travel time comprises:

adding a time taken to travel between the any two consecutive junctions on the route and the traffic states between the any two consecutive junctions on the route at different instants of time.

30. The device according to claim 25, wherein planning an optimized route between the selected source and the selected destination comprises:

identifying an optimum path between the selected source and the selected destination using one of static estimation or dynamic estimation.

31. The device according to claim 30, wherein the static estimation identifies a best route based on a least amount of time taken to reach the selected destination and the traffic density values of the junctions between the selected source and the selected destination.

32. The device according to claim 30, wherein the dynamic estimation identifies the best route by utilizing a graph theory algorithm.

33. The device according to claim 25, wherein analayzing the impact of congestion comprises:

selecting a congestion time window tc;

computing a travel time t1 between a pair of junctions J1 and J2 from using historical data;

obtaining traffic density values D1 for junction J1 between timestamps t and t+tc, and traffic density values D2 for junction J2 between timestamps t+t1 and t+t1+tc, where t is the time at any given instant determing a correlation value between the traffic density values D1 and D2; and comparing the correlation value with a third set of threshold values to categorize a congestion impact as one of high, medium, low or negative.

34. The device according to claim 33, wherein the third set of threshold values comprises a minimum threshold value below which the congestion impact at J2 on J1 is low and a maximum threshold value above which the congestion impact at J2 on J1 is high.

35. The device according to claim 33, wherein there is congestion impact at J1 due to traffic at J2 when the correlation value is negative.

36. The device according to claim 24, wherein the processor is further configured to execute programmed instructions stored in the memory further comprising:

receiving a user selection of one among the plurality of fields of view for the selected video image capturing device.

37. The device according to claim 24, wherein the region of interest is a flexible convex shaped polygon.

38. The device according to claim 24, wherein the processor is further configured to execute programmed instructions stored in the memory further comprising:

enhancing contrast in a shadowed region in the region of interest; and smoothing the region of interestfor image noise reduction prior to segmentation of the region of interest into sub-windows.

39. The device according to claim 24, wherein the textural feature extraction technique utilizes a histogram of a plurality of Oriented Gradient descriptors in the sub-windows while converting the sub-windows into feature vectors.

40. The device according to claim 24, wherein generating the traffic confidence value or no-traffic confidence value comprises:

utilizing a non-linear interpolation to provide weightage to the sub-windows based on the distance of the sub-windows from a field of view of the selected video image capturing device.

41. The device according to claim 24, wherein the traffic density classifier is pre-trained with a number of manually selected video image data with and without the presence of traffic objects.

42. The device according to claim 24, wherein the first set of threshold values comprise a minimum threshold value below which the traffic density is low and a maximum threshold above which the traffic density is high.

43. The device according to claim 24, wherein the processor is further configured to execute programmed instructions stored in the memory further comprising:

generating an alarm message when the traffic density value exceeds the first set of threshold values.

44. A traffic management computing device comprising:

a processor coupled to a memory and configured to execute programmed instructions stored in the memory, comprising:

collecting a set of misclassified video image data of a video image capturing device from among plurality of video image capturing devices; and utilizing a reinforcement learning to train a traffic density classifier with a valid set of video image data for corresponding to predefined settings of the video image capturing devices.

45. The device according to claim 44, wherein collecting the set of misclassified video image comprises:

cross-validating the classified video image data with a master classifier, where the master classifier is trained with video image data of multiple textures and color features.

46. The device according to claim 45, wherein the predefined settings of the image capturing device comprise one or more of a view angle, a distance, or a height.

47. A non-transitory computer readable medium program having stored thereon instructions for analyzing on-road traffic density comprising machine executable code which when executed by a processor, causes the processor to perform steps comprising:

receiving a user selection of a video image capturing device from among a plurality of video image capturing devices communicatively coupled to the traffic management computing device;

receiving a user selection of coordinated in one of one or more video image frames of an on-road traffic scenario captured by the selected video image capturing device such that the coordinates form a closed region of interest;

segmenting the region of interest into on or more overlapping sub-windows;

converting the one or more overlapping sub-windows into one or more feature vectors through a textural feature extraction technique;

generating at least a traffic confidence value or no traffic confidence value for each of the feature vectors to classify the sub-windows as having at least a high traffic value or a low traffic value by a traffic density classifier;

computing a traffic density value depending on a number of the sub-windows with a high traffic value and a total number the sub-windows within the region of interest;

comparing the traffic density value with a first set of threshold values to categorize the video image frame as having low, medium or high traffic; and displaying traffic density values at different instants in a time window to enable monitoring of a traffic end.

48. The medium according to claim 47, wherein estimating the traffic density value further comprises:

estimating a traffic state at a junction;

estimating a travel time between any two consecutive junctions on a route, wherein the route includes a plurality of junctions;

determing an optimized route between a selected source and a selected destination on the route; and analyzing an impact of congestion at one junction on another junction on the route.

49. A non-transitory computer readable medium program having stored thereon instructions for re-training a traffic density classifier comprising machine executable code which when executed by a processor, causes the processor to perform steps comprising:

collecting a set of misclassified video image frames captured by an image capturing device from among a plurality of image capturing devices; and utilizing a reinforcement learning to train the traffic density classifier with a valid set of video image frames corresponding to predefined settings of the image capturing device.

50. The medium according to claim 49, wherein collecting the set of misclassified video image frames comprises:

cross-validating the classified video image frames with a master classifier, where the master classifier is pretrained with video image frames of multiple textures and color features.

* * * * *